United States Patent [19]

Coll et al.

[11] Patent Number: 4,524,585
[45] Date of Patent: Jun. 25, 1985

[54] SHORT MASTER-CYLINDER

[75] Inventors: Juan V. Coll; Joan S. Bacardit; Joaquim F. Bofill, all of Barcelona, Spain

[73] Assignee: Bendiberica /S.A., Barcelona, Spain

[21] Appl. No.: 560,284

[22] Filed: Dec. 12, 1983

Related U.S. Application Data

[63] Continuation of Ser. No. 283,392, Jul. 15, 1981, abandoned.

[30] Foreign Application Priority Data

Jul. 30, 1980 [ES] Spain ............................ 494.697

[51] Int. Cl.³ .............................................. B60T 11/20
[52] U.S. Cl. ........................................ 60/562; 60/589; 60/591
[58] Field of Search ................. 60/562, 588, 589, 591; 92/162 R

[56] References Cited

U.S. PATENT DOCUMENTS

| | | | |
|---|---|---|---|
| 2,325,284 | 7/1943 | Swift | 60/562 |
| 2,569,025 | 9/1951 | Schultz | 60/588 |
| 2,577,153 | 12/1951 | Pratt | 60/588 |
| 2,833,602 | 5/1958 | Bayer | 92/162 R |
| 3,232,628 | 2/1966 | Brand | 60/562 |
| 3,296,798 | 1/1967 | Shutt | 60/562 |
| 3,473,330 | 10/1969 | Fritz | 92/162 R |
| 3,701,257 | 10/1972 | Gaiser | 60/562 |
| 4,078,386 | 3/1978 | Ewald | 60/562 |
| 4,161,105 | 7/1979 | Hagiwara | 60/562 |
| 4,329,846 | 5/1982 | Gaiser | 60/562 |

FOREIGN PATENT DOCUMENTS

| | | |
|---|---|---|
| 1243539 | 6/1967 | Fed. Rep. of Germany . |
| 2738742 | 3/1979 | Fed. Rep. of Germany . |
| 2361258 | 10/1978 | France . |
| 2017240 | 10/1979 | United Kingdom ................. 60/562 |

*Primary Examiner*—Abraham Hershkovitz
*Attorney, Agent, or Firm*—Larry J. Palguta; Ken C. Decker

[57] ABSTRACT

A shortened master-cylinder comprising longitudinal grooves on the inner surface of the bore of the cylinder and provided to allow permanent communication between a fluid pressure chamber and the corresponding fluid output.

11 Claims, 2 Drawing Figures

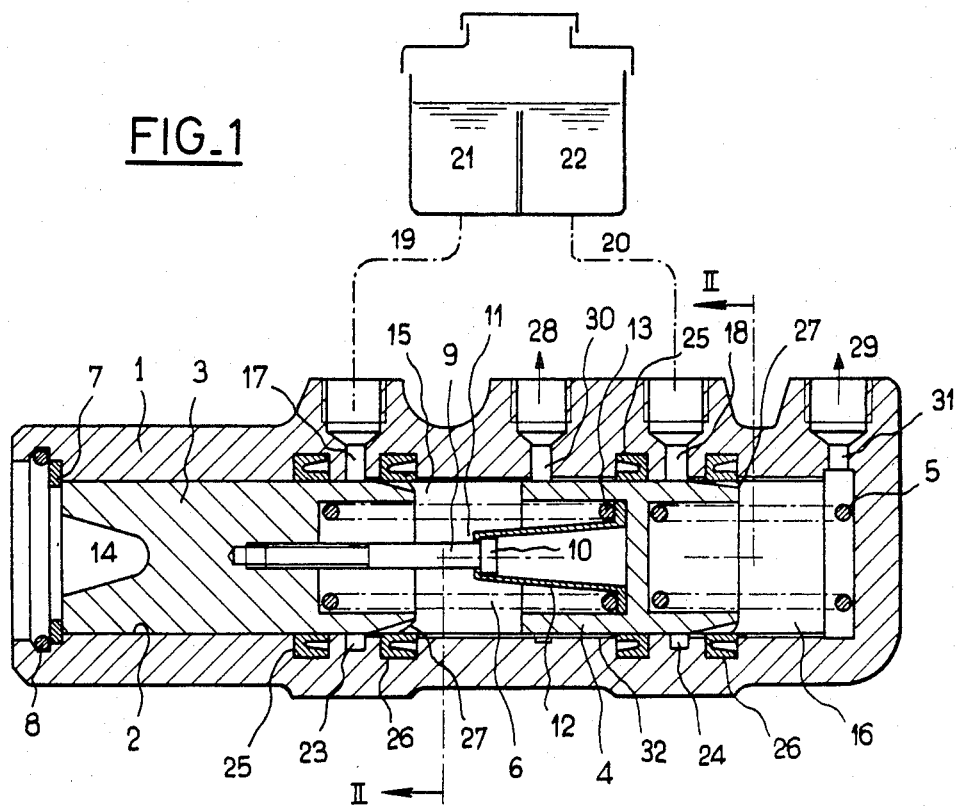
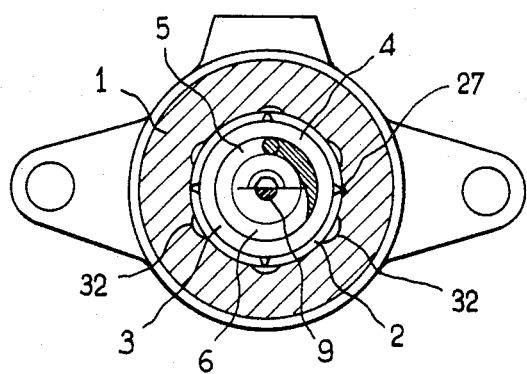

SHORT MASTER-CYLINDER

This is a continuation of application Ser. No. 283,392, filed July 15, 1981, now abandoned.

The invention concerns a short master cylinder.

With hydraulic brake installations on vehicles equipped with independent brake systems, master-cylinders are used which have a primary and a secondary piston which slide hermetically inside a cylindrical housing, forming two pressure chambers which communicate respectively with two brake circuits and with two hydraulic liquid feed reservoirs. These latter connections are generally made through two compensation or dilation passages which are kept one in idle position of the cylinder, but closed by the pistons as soon as the latter begin their braking stroke.

It is obvious that the communication of the pressure chambers located between the two pistons, with the respective brake circuits must be made by orifices through the lateral wall of the housing, between the two pistons which limit the pressure chamber. For this one must allow an adequate distance between the outlet of the primary pressure enclosure and the pistons, so that the outlet cannot be locked, either by the secondary piston or by the primary piston in any of the positions of their strokes. This stroke distance imposes, as we know, a considerable limitation in the design of the shortest possible master-cylinders which, further, is a very obvious necessity in today's car design.

The present invention solves these problems by improving the master-cylinders mentioned above by considerably reducing their constructive length.

To this purpose, the invention concerns a brake master cylinder, comprised of a primary piston and a secondary piston sliding hermetically within a cylindrical housing, to form two pressure chambers which communicate respectively with two brake circuits and two hydraulic fluid feed reservoirs, these latter communications occurring through two compensation or dilation passages, open in the master cylinder idle position and, characterized by the fact that the pistons have smooth lateral surfaces which adjust by sliding hermetically with sealing rings fastened in annular grooves of the housing interior wall, and that one outlet orifice of the primary pressure chamber communicates with longitudinal grooves on the bore interior surface in such a way that communication is maintained regardless of the position of the pistons, which makes it possible to reduce the overall length of the master cylinder.

The compensation or dilation passages are preferably formed by the longitudinal grooves on the inner surface of the cylindrical housing, and they run from the feed passages, which are covered by the ends of the respective pistons, as far as a position immediately in front of their closing edges, in relation to the piston advance direction. More specifically, the compensation or dilation passages are defined by sealing rings, fastened in annular grooves of the cylinder interior wall, which limit the longitudinal compensation or dilation grooves, and the inlet edge of which is opposite, in the master cylinder idle position, chamfers from the pressure surface of the corresponding pistons.

The attached drawings show a non-limitative example of the scope of this invention and, in schematic diagrams, a favorable design for a master cylinder conforming to this invention is represented.

In the drawings in question:

FIG. 1 is an axial cross-section of a master cylinder which incorporates the improvements of this invention for two independent brake systems, shown in idle position; and FIG. 2 shows a transversal cross-section of the same cylinder shown along its II—II reference line.

In these figures, the master cylinder has a barrel (1), in which a blind cylindrical bore (2) has been made, and inside which a primary piston (3) and a second piston (4) slide hermetically. Between the cylinder end and an axial cavity in the forward surface of the secondary piston (in relation to the secondary piston advance direction), a compression coil spring (5) is housed. Between the cavities located axially and opposite in the two pistons, is located a compression coil spring (6). These two springs are dimensioned so that they tend to secure the two pistons in the idle position shown, against a retainer washer (7) which is supported by means of an elastic ring (8) placed on the bore opening. An axial bolt (9) stands out frontally from the primary piston (3). Its head (10) is hooked behind a terminal flange (11) formed at the end of a sleeve (12), the opposite end of which has an exterior flange (13) which is thrust against the spring (6). This device is designed to ensure positive return of the secondary piston (4) to the idle position shown, in case of functional resistance which could happen. The primary piston can be actuated by conventional means such as, for instance, a pedal rod acting against the seat of the ball-joint (14) from its outside end.

As can be seen, a primary pressure chamber (15) is formed between the two pistons (3 and 4), and a secondary pressure chamber (16) between piston (4) and the cylinder end. Both these enclosures are fed with fluid through the orifices (17 and 18) and the lines (19 and 20) from the independent reservoirs (21 and 22). Each of these orifices (17, 18) opens into the bore (2) through an annular groove (23 and 24), and each groove has two sealing rings (25, 26) on each side, capable of adjusting hermetically to the lateral surface of the pistons. Further, the front ends of the pistons have a series of grooves or chamfers (27) and their layout is such that, in either case, these grooves or chamfers provide communication between the inlet grooves (23, 24) and the pressure chambers, when the master cylinder elements are in the idle position shown; this communication, however, is stopped when the seals (26) are adjusted against the lateral surfaces of the respective pistons as soon as the latter begin their braking stroke. This is quite clearly shown on the figures.

Both the pressure chambers (15 and 16) communicate with the respective braking circuits shown by the arrows (28, 29), through the orifices (30, 31).

As can be seen from FIG. 1, the orifice (30) would be closed by the secondary piston (4) or the primary piston (3), with a standard design, with effect from a given point along its stroke. However, with this invention, this situation is avoided by the fact that the surface of the bore (2) has a series of longitudinal grooves (32) which communicate with the orifice (30) in such a way that they maintain this communication, even though one or the other of the pistons is in front of this orifice.

It is obvious that, in the absence of the longitudinal grooves (32), the cylinder shown would need to be lengthened to a value formed of the distance by which the secondary piston covers the orifice (32) plus the distance by which the primary piston (3) would cover it when the two pistons reach the end of their additional strokes. These added distances would consequently make up the excess length of a conventional master cylinder with respect to the master cylinder shown, if it were designed to operate in the same conditions.

Furthermore, it is to be noted that longitudinal grooves (32) can be continued up to communication with orifice (17) and the corresponding annular groove (23), thus forming a part of the compensation or dilatation passages (23, 27, 32) of the primary pressure chamber (15). The same arrangement is possible to define the compensation or dilatation passage of the secondary pressure chamber (16).

We claim:

1. A brake master cylinder comprising a primary piston and a secondary piston sliding within a cylindrical housing to form two pressure chambers which communicate respectively with two brake circuits via outlet orifices and two hydraulic fluid feed reservoirs, these latter communications occurring through two compensation passages open to the chambers, respectively, in an idle position, and characterized by the pistons each having smooth lateral surfaces slidably engaging a housing interior wall and movable relative to fixed sealing rings fastened in annular grooves of the housing interior wall, and that one outlet orifice of one of the pressure chambers communicates with longitudinal grooves formed each with a width less than the circumference of said housing interior wall and in the housing interior wall in such a way that communication is maintained between the one outlet orifice and the one pressure chamber regardless of the position of the pistons in front of or overlapping the one outlet orifice, to enable reduction of the overall length of the master cylinder.

2. A brake master cylinder in accordance with claim 1, characterized by the fact that the longitudinal grooves extend from the primary piston in the idle position to the one orifice.

3. A brake master cylinder in accordance with claim 1 characterized in that the longitudinal grooves extend from the primary piston in the idle position to one of the fixed sealing rings engageable with the secondary piston.

4. A brake master cylinder in accordance with claim 1, characterized by the compensation passages being formed by the longitudinal grooves of the housing interior wall which grooves extend from feed passages open to the respective reservoirs and covered by the ends of the respective pistons in the idle position, to a position immediately in front of the closing edges of the respective pistons.

5. A brake master cylinder comprising:
a cylindrical housing;
an axially extending bore formed in said housing and defined peripherally by an inner surface of said housing;
a primary piston and secondary piston slidingly received within said bore so as to define therein a primary pressure chamber between said pistons and a secondary pressure chamber separated from said primary pressure chamber by said secondary piston;
each said chamber communicating respectively permanently with a brake circuit, and selectively with a brake fluid reservoir through a compensation passage normally open when the master cylinder is in rest condition;
each said piston having a smooth peripheral surface which cooperates in sliding sealing contact engagement with a pair of stationary annular sealing rings received within axially spaced annular grooves formed in said inner surface of said housing; and
an outlet orifice formed in said housing for fluid communication between said primary pressure chamber and the associated brake circuit, said outlet orifice communicating permanently with at least one longitudinal groove formed with a width less than the circumference of said inner surface and within said inner surface of said housing and extending axially at least over the axial extension of said primary pressure chamber, the fluid communication between said primary pressure chamber and said outlet orifice being permanently achieved irrespective of the position of said pistons.

6. A master cylinder according to claim 5, wherein at least the compensation passage for said primary pressure chamber includes an end portion of said longitudinal groove opposite to said outlet orifice.

7. A master cylinder according to claim 6, wherein at least said primary piston has a chamfered front end portion which is located adjacent said end portion of said longitudinal groove when the master cylinder is in rest position.

8. A master cylinder according to claim 7, wherein said compensation passage for each said pressure chamber includes an inlet orifice formed in said housing and opening into said bore between the sealing rings of each respective pair of sealing rings, one of the sealing rings of the pair associated to the compensation passage for said primary pressure chamber being located intermediate said end portion of said longitudinal groove.

9. A master cylinder according to claim 8, comprising an outlet orifice for said second pressure chamber axially spaced from said compensation passage for said secondary pressure chamber, further including at least a longitudinal groove formed within the inner surface of said bore and extending axially between said outlet orifice and said inlet orifice of said secondary pressure chamber, said secondary piston having a chamfered front end portion.

10. A master cylinder comprising a housing, a cylindrical bore formed in said housing, two axially spaced pistons sealingly slidingly received within said bore and defining therein two sealingly separated and axially spaced pressure chambers, each piston having a smooth peripheral surface and a tapered end portion extending within the associated pressure chamber, each chamber communicating permanently with an associated brake circuit via an outlet orifice formed in said housing and opening into said bore, and selectively, when the master cylinder is in rest condition, with a brake fluid reservoir via an inlet orifice formed in said housing at a distance axially from the associated outlet orifice and opening into said bore, wherein at least one of said chambers includes longitudinal grooves formed each with a width less than a circumference of said bore and in said bore and extending axially between the associated inlet and outlet orifices, a sealing ring being disposed within an annular groove interrupting said longitudinal grooves adjacent said inlet orifice, said sealing ring facing radially said tapered end portion of the associated piston and being spaced radially therefrom when the master cylinder is in rest condition but cooperating in sliding sealed contact with said smooth peripheral surface of said associated piston when the master cylinder is operated.

11. A master cylinder according to claim 10, said pistons being mechanically coupled, said one piston being the primary piston and said associated chamber being the primary chamber of the master cylinder, wherein said outlet orifice of said primary chamber opens into said bore at a location facing said smooth peripheral surface of the secondary piston when the master cylinder is in rest condition.

* * * * *